(12) United States Patent
Gehtman et al.

(10) Patent No.: US 11,397,810 B2
(45) Date of Patent: *Jul. 26, 2022

(54) MALICIOUS CODE PURIFICATION IN THE BODY OF GRAPHICS FILES

(71) Applicant: Dell Products L.P., Round Rock, TX (US)

(72) Inventors: Yevgeni Gehtman, Modi'in (IL); Maxim Futerman, Ashdod (IL)

(73) Assignee: Dell Products L.P., Round Rock, TX (US)

( * ) Notice: Subject to any disclaimer, the term of this patent is extended or adjusted under 35 U.S.C. 154(b) by 382 days.

This patent is subject to a terminal disclaimer.

(21) Appl. No.: 16/531,676

(22) Filed: Aug. 5, 2019

(65) Prior Publication Data

US 2021/0042410 A1 Feb. 11, 2021

(51) Int. Cl.
 *G06F 21/56* (2013.01)
 *H03M 7/30* (2006.01)
(52) U.S. Cl.
 CPC .......... *G06F 21/564* (2013.01); *G06F 21/568* (2013.01); *H03M 7/702* (2013.01)
(58) Field of Classification Search
 CPC ..... G06F 21/564; G06F 21/568; H03M 7/702
 USPC .......................................................... 726/24
 See application file for complete search history.

(56) References Cited

U.S. PATENT DOCUMENTS

| 2008/0050029 | A1* | 2/2008 | Bashyam | G06T 9/001 |
| | | | | 382/243 |
| 2010/0180191 | A1* | 7/2010 | Taber | G06F 16/5846 |
| | | | | 707/E17.061 |
| 2018/0218155 | A1* | 8/2018 | Grafi | G06F 21/568 |
| 2018/0268141 | A1* | 9/2018 | Hagen | G06F 21/564 |
| 2020/0210572 | A1* | 7/2020 | Devane | G06F 21/564 |
| 2020/0342100 | A1* | 10/2020 | Goldstein | G06F 21/564 |
| 2020/0349257 | A1* | 11/2020 | Saffar | G06N 5/046 |

OTHER PUBLICATIONS

File Signatures Table by Gary Kessler; web.archive.org, Date: Aug. 8, 2018 The Wayback Machine—https://web.archive.org/web/20180821075325/https://www.garykessler.net/library/fil . . . (Year: 2018).*
Steinebach et al., 2015 Wiley-IEEE Press, "Advanced Multimedia File Carving", pp. 219-269 (Year: 2015).*
Kittelmanna et al. 2017 arXiv, "Monte Carlo Particle Lists: MCPL", pp. 1-47 (Year: 2017).*

* cited by examiner

*Primary Examiner* — Khalil Naghdali
(74) *Attorney, Agent, or Firm* — Norton Rose Fulbright US LLP

(57) ABSTRACT

An information handling system improves removal of steganography data embedded in a graphics file by processing graphics files stored in a file system or transmitted through a network by processing the graphics files in a steganalyzer. The steganalyzer converts the body segment of the graphics file into binary code, and then compresses the binary code into a graphics file. This process results in the removal of any potential malicious code. The body segment location can be determined by parsing the portable network graphics file to determine a location of a pre-fix graphics file signature and a post-fix graphics file signature, with the graphics files signatures being specific to a particular type of graphics file.

20 Claims, 8 Drawing Sheets

| | | | | | | | | | | | | | | |
|---|---|---|---|---|---|---|---|---|---|---|---|---|---|---|
| 00000000 | 89 | 50 | 4E | 47 | 0D | 0A | 1A | 0A | 00 | 00 | 00 | 0D | 49 | 48 | 44 | 52 | ‰PNG    IHDR |
| 00000010 | 00 | 00 | 02 | 58 | 00 | 00 | 02 | 58 | 08 | 03 | 00 | 00 | 00 | 89 | B8 | 68 | X   X   ‰₀h |
| 00000020 | EE | 00 | 00 | 00 | 04 | 67 | 41 | 4D | 41 | 00 | 00 | B1 | 8F | 0B | FC | 61 | gAMA ± ■a |
| 00000030 | 05 | 00 | 00 | 00 | 01 | 73 | 52 | 47 | 42 | 00 | AE | CE | 1C | E9 | 00 | 00 | sRGB ®' |
| 00000040 | 03 | 00 | 50 | 4C | 54 | 45 | 47 | 70 | 4C | F9 | FA | FB | E6 | EC | F4 | F5 | PLTEGpL■■ ■■ |
| 00000050 | F6 | F9 | CD | D2 | DB | F9 | F9 | FB | D7 | DF | EA | E0 | E4 | E9 | E6 | EA | |
| 00000060 | ED | E0 | E7 | F0 | F8 | F9 | FB | EB | EF | F5 | F7 | F8 | FB | E8 | EC | F | |
| 00000070 | F8 | FA | FC | DF | E4 | EE | F4 | F6 | FA | F8 | FA | FC | F8 | FA | FC | F | |
| 00000080 | FA | FC | F8 | FA | FB | F6 | F8 | FA | F7 | F8 | FB | D1 | D6 | E1 | F9 | FA | |
| 00000090 | FB | F7 | F8 | FB | F5 | F7 | FA | FA | F8 | FA | F7 | F9 | FB | F7 | F9 | FB | |
| 000000A0 | F6 | F8 | FA | F7 | F8 | FA | E8 | EC | F3 | 8E | A0 | B3 | 76 | A0 | C9 | E³ | |
| 000000B0 | ED | F3 | B2 | BC | CC | EA | EE | F4 | D8 | DE | E9 | D2 | D9 | E6 | D3 | DA | |
| 000000C0 | E8 | C9 | D4 | E1 | CA | D2 | E5 | DD | E3 | EE | D4 | DB | EB | B7 | C5 | D1 | |
| 000000D0 | D2 | D9 | E8 | 6D | 89 | A6 | CB | D5 | E4 | 8A | AB | C9 | 83 | A9 | CE | 84 | |
| 000000E0 | A5 | C2 | AE | C6 | DE | C1 | CE | E3 | 86 | AC | CE | 6C | 8F | B7 | 62 | 7B | |
| 000000F0 | 9C | AC | C2 | DA | 8E | B4 | D6 | A1 | C1 | DB | 68 | 87 | AB | 35 | 46 | 59 | |
| 00000100 | 07 | 08 | 08 | AA | AB | A9 | 0C | 0C | 0C | AB | AD | AA | AE | B0 | AD | 95 | |
| 00000110 | 97 | 94 | B0 | B1 | AF | 99 | 9A | 98 | A2 | A4 | A1 | 0E | 0E | 0E | 9F | A1 | |
| 00000120 | 9E | B2 | B4 | B1 | 24 | 24 | 24 | 22 | 22 | 22 | 9E | A0 | 9D | 3A | 3B | 3B | ²¹ ±$$$ |
| 00000130 | 26 | 26 | 26 | 91 | 93 | 90 | 1B | 1B | 1C | B4 | B6 | B3 | 06 | 06 | 06 | 9B | &&& |
| 00000140 | 9D | 9A | 3D | 3E | 3E | 28 | 28 | 28 | 0A | 0A | 0B | 09 | 09 | 09 | 10 | 10 | =>>((( |
| 00000150 | 10 | A8 | A9 | A7 | 2A | 2A | 2A | 20 | 20 | 20 | 2C | 2C | 2C | 12 | 12 | 12 | "©§*** |
| 00000160 | A5 | A7 | A5 | 30 | 30 | 30 | 1E | 1E | 1E | 2E | 2E | 2E | 34 | 34 | 34 | 36 | ¥§¥000    ...4446 |
| 00000170 | 36 | 36 | 32 | 32 | 32 | 6A | 6C | 6B | 40 | 40 | 41 | 8B | 8D | 8B | 57 | 58 | 66222jlk@@A<  <WX |
| 00000180 | 58 | 4E | 4E | 4E | 38 | 38 | 38 | AD | AE | AC | 47 | 48 | 48 | 8E | 90 | 8D | XNN0888 @.CHH |

FIG. 6

| | 730 | | | | | | | | | | | | | | | | 740 |
|---|---|---|---|---|---|---|---|---|---|---|---|---|---|---|---|---|---|
| 00000000 | FF | D8 | FF | E0 | 00 | 10 | 4A | 46 | 49 | 46 | 00 | 01 | 01 | 00 | 00 | 01 | ▮a▮X  JFIF |
| 0000001C | 00 | 01 | 00 | 00 | FF | DB | 00 | 84 | 00 | 09 | 06 | 07 | 13 | 13 | 12 | 15 | ▮▮ |
| 00000020 | 13 | 13 | 13 | 15 | 16 | 15 | 15 | 18 | 17 | 1A | 18 | 18 | 15 | 17 | 17 | 17 | |
| 00000030 | 18 | 18 | 17 | 15 | 15 | 17 | 18 | 17 | 18 | 15 | 17 | 18 | 1D | 28 | 20 | 18 | ( |
| 00000040 | 1A | 25 | 1B | 18 | 17 | 21 | 31 | 21 | 25 | 29 | 2B | 2E | 2E | 2E | 17 | 1F | %  ! ! %)+... |
| 00000050 | 33 | 38 | 33 | 2D | 37 | 28 | 2D | 2E | 2B | 01 | 0A | 0A | 0A | 05 | 05 | 05 | 383-7(-.+ |
| 00000060 | 0E | 05 | 05 | 0E | 2B | 19 | 13 | 19 | 2B | 2B | 2B | 2B | 2B | 2B | 2B | 2B | +  ++ +++ +++ |
| 00000070 | 2B | 2B | 2B | 2B | 2B | 2B | 2B | 2B | 2B | 2B | 2B | 2B | 2B | 2B | 2B | 2B | ++ +++ ++ +++ ++ +++ |
| 00000080 | 2B | 2B | 2B | 2B | 2B | 2B | 2B | 2B | 2B | 2B | 2B | 2B | 2B | 2B | 2B | 2B | ++ +++ ++ +++ ++ +++ |
| 00000090 | 2B | 2B | 2B | 2B | 2B | 2B | 2B | 2B | 2B | 2B | FF | C0 | 00 | 11 | 08 | 00 | ++ +++ ++ +++▮ |
| 000000A0 | A8 | 01 | 2C | 03 | 01 | 22 | 00 | 02 | 11 | 01 | 03 | 11 | 01 | FF | C4 | 00 | "  ,  "  ▮. |
| 000000B0 | 1C | 00 | 00 | 00 | 07 | 01 | 01 | 00 | 00 | 00 | 00 | 00 | 00 | 00 | 00 | 00 | |
| 000000C0 | 00 | 00 | 00 | 01 | 02 | 03 | 04 | 05 | 06 | 07 | 08 | FF | C4 | 00 | 3E | 10 | ▮ . > |
| 000000D0 | 00 | 01 | 02 | 03 | 04 | 07 | 05 | 05 | 07 | 04 | 02 | 03 | 00 | 00 | 00 | 00 | |
| 000000E0 | 01 | 00 | 02 | 03 | 04 | 11 | 12 | 21 | 31 | 51 | 05 | 41 | 61 | 71 | 81 | 91 | ! ! Q .Aaq |
| 000000F0 | A1 | 06 | 22 | B1 | C1 | F0 | 13 | 23 | 32 | 52 | D1 | 07 | 14 | 42 | 62 | 72 | ¡ "±#2 )ᵪR  Bbr |

MALICIOUS CODE PURIFICATION IN THE BODY OF GRAPHICS FILES

FIELD OF THE DISCLOSURE

The present disclosure generally relates to information handling systems, and more particularly relates to malicious code purification of graphics files.

BACKGROUND

As the value and use of information continue to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system improves removal of steganography data embedded in a graphics file, such as a portable network graphics (PNG) or Joint Photographic Experts Group (JPG) files, by parsing the graphics file to locate a body segment within the graphics file. That body segment can be converted to binary code that represents the image contained in the body segment. The binary code can then be converted into a replacement body segment for a graphics file. The process of converting the body segment into binary code and back results in the deletion of malicious code within the replacement body segment. The conversion may be carried out with a lossless compression algorithm that results in the replacement body segment being an exact duplicate of the image contained in the original graphics file.

In some embodiments, the body segment can be located by determining a location of a graphics file signature in the graphics file. The graphics file signature can assist with defining the body segment from within the graphics file. Two graphics file signatures can be used to further define the body segment from within the graphics file. The two graphics file signatures may include a pre-fix signature and a post-fix signature, with the body segment being the data contained between the pre-fix signature and the post-fix signature.

When the steganography data removal process described herein is applied as part of a server or scanning system, the system may scan each file passing through the server. Each file, regardless of extension of the file or other metadata, may be scanned. For each file, the system may determine whether the file contains a body segment comprising graphics data, and if so, apply the described embedded data removal process, such as by converting to binary code and back to a graphics format. In some embodiments, the scanning system may be a cloud-based system, a local area network server, or a service running on a client computer.

According to one embodiment, a method for purification of embedded data from a file may include determining, by a processor, a presence of a body segment of a file containing graphics data such that the file is a graphics file; converting, by the processor, the body segment of the graphics file into representative binary code; converting, by the processor, the representative binary code into a replacement body segment for the graphics file; and/or writing, by the processor, a new graphics file comprising the replacement body segment. In some embodiments, the step of converting the representative binary code into the replacement body segment comprises executing a lossless data compression algorithm. In some embodiments, the step of determining the body segment comprises parsing, by the processor, the graphics file to determine a location of a graphics file signature in the graphics file. The parsing may include determining a location of a pre-fix graphics file signature and a location of a post-fix graphics file signature, wherein the body segment is defined as the data between the pre-fix graphics file signature and the post-fix graphics file signature. The purification method may be applied by scanning a plurality of files to determine an existence of a graphics file, wherein the plurality of files comprises graphics files and non-graphics files.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which:

FIG. 6 is an example of a PNG file showing a pre-fix graphics file signature according to at least one embodiment of the present disclosure;

FIG. 7 is an example of a JPG file showing a pre-fix graphics signature according to at least one embodiment of the present disclosure; and FIG. 8 is an example of a PNG file showing a post-fix graphics signature according to at least one embodiment of the present disclosure.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications and with several different types of architectures, such as distributed computing architectures, client/server architectures, or middleware server architectures and associated resources.

Figure 1:
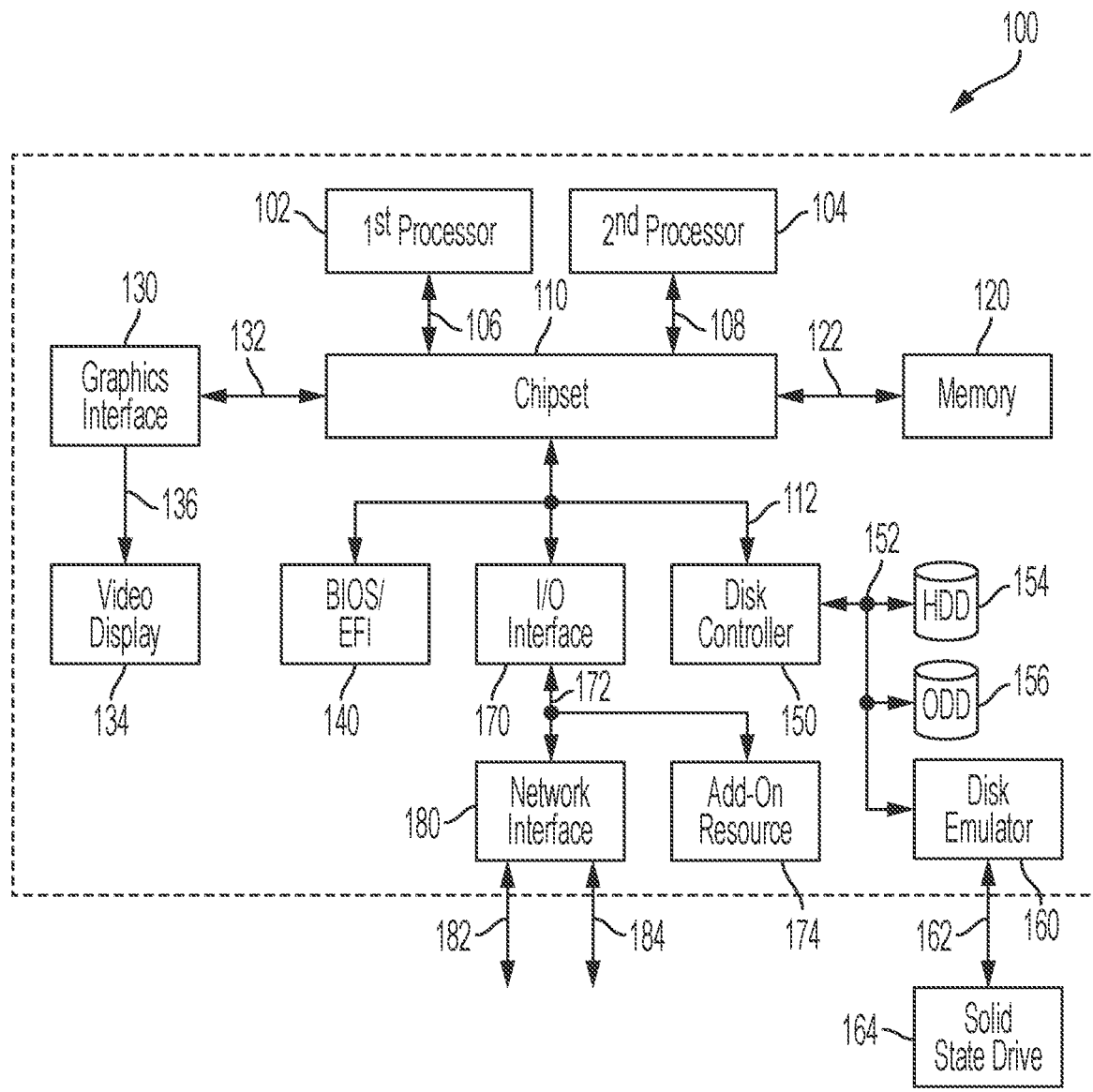
FIG. 1 is a block diagram of an information handling system, according to at least one embodiment of the present disclosure.

FIG. 1 illustrates a generalized embodiment of information handling system 100. For purpose of this disclosure, information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input/output (I/O) devices, such as a keyboard, a mouse, and a video display. Information handling system 100 can also include one or more buses operable to transmit information between the various hardware components.

Information handling system 100 includes processors 102 and 104, a chipset 110, a memory 120, a graphics interface 130, include a basic input and output system/extensible firmware interface (BIOS/EFI) module 140, a disk controller 150, a disk emulator 160, an I/O interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132 and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read-only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, an SCSI interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, an SCSI interface, a USB interface, a proprietary interface, or a combination thereof. Disk emulator 160 permits a solid-state drive 164 to be connected to information handling system 100 via an external interface 162. An example of external interface 162 includes a universal serial bus (USB) interface, an Institute of Electrical and Electronics Engineers (IEEE) 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface 180 includes network channels 182 and 184 that provide interfaces to devices that are external to information handling system 100. In a particular embodiment, network channels 182 and 184 are of a different type than peripheral interface 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Figure 2:
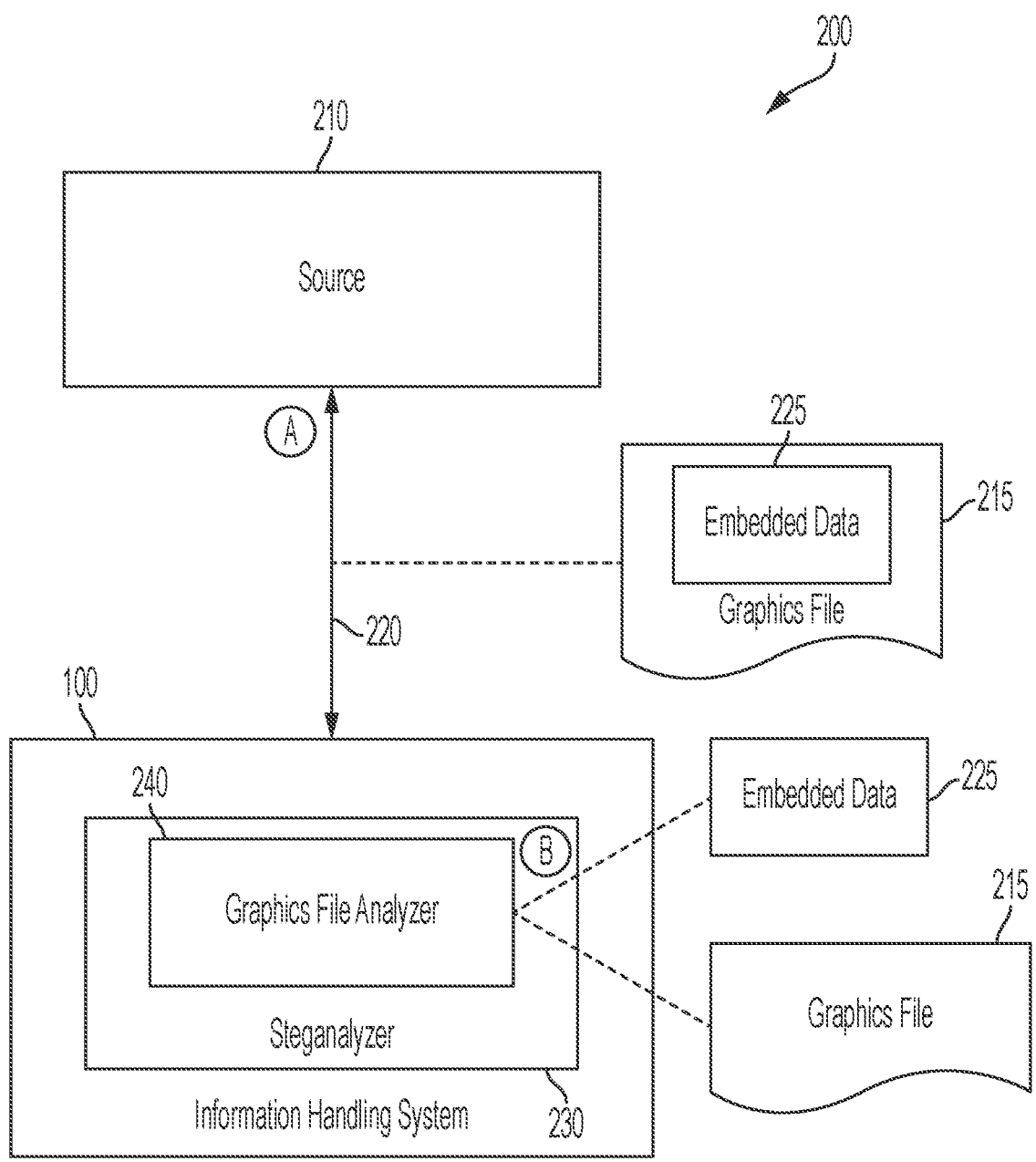
FIG. 2 is a block diagram of a computer system for detecting and removing embedded data from portable network graphics (PNG) files, according to at least one embodiment of the present disclosure.

FIG. 2 shows a computer system 200 for detecting and removing embedded data from graphics files. A graphics file, such as a PNG or JPG file, is a computer file format for storing, transmitting, and displaying images. A PNG file includes a pre-fix graphics file signature, which can include an initial eight bytes identifying the file as a PNG file. The pre-fix PNG signature includes the hexadecimal values 89 50 4E 47 0D 0A 1A 0A 00 00 00 0D 49 48 44 52 00 00, which appear at the beginning of PNG files. The PNG signature is followed by a series of chunks of data that encode image information. Every chunk has a similar structure which includes a 4-byte length field, a 4-byte chunk type field, between 2,147,483,647 bytes of chunk data, and a 4-byte cyclic redundancy check value (CRC). The length field refers to the length of the chunk data field. The chunk type field may be one of several chunk types which include an image header (IHDR) chunk usually located at the beginning followed by one or more image data (IDAT) chunks and an image end (IEND) chunk at the end. The IDAT chunk contains the actual image data. The IHDR chunk specifies information regarding image size, color model, bit depth, and interlacing. The IEND chunk is a four-byte chunk that marks the end of the PNG file. The IEND chunk may include a graphics file signature used to assist in detected embedded data in the PNG file. The PNG file can include a post-fix graphics file signature at the end of the body of the graphics file, which can include the hexadecimal values 00 00 00 00 49 45 4E 44 AE 42 60 82. A JPG file is another computer file format for storing, transmitting, and displaying images. The JPG file includes a pre-fix graphics file signature, which can include the hexadecimal values FF D8 FF E0 00 10 4A 46 49 46 00 010100 00 0100 0100 00 FF DB 00 84 00 09 06 07, which appear at the beginning of JPG files. In some embodiments, the signature used to process a graphics file may be a subset of the hexadecimal digits described herein, or may be a larger signature that includes as a portion the hexadecimal digits described herein.

Steganography is used to hide information or data such as malicious software or malware by embedding the data within images, messages, text, files, audio, video, or other digital media. The hidden data may be in plaintext, cipher text, images, or anything that can be embedded within the digital media. Generally, malware may be characterized by persistent, background execution with a purpose of stealing sensitive information, obtaining unauthorized access to computing resources, or something that an attacker wants the malware to do. Typically detecting malware uses a cryptographic hash. Cryptographic hashes of executable files of known malware may be stored in a database, and anti-virus applications may scan a target system for files having matching cryptographic hashes. Such detection techniques may be thwarted by creating variants that have a same or similar functionality but different cryptographic hashes. This detection technique may also be thwarted by malware that actively seeks to avoid detection by using steganography, disabling the anti-virus applications, embedding itself into an operating system kernel, and other methods. Instead of relying on identifying cryptographic hashes, the present disclosure focuses on detecting steganography by decoding digital media files to identify embedded data. Accordingly, the present disclosure does not suffer from the limitations identified above.

Embodiments described herein provide a system and method of malicious data detection and purification of the graphics files. As used herein, purification refers to detection and extraction of embedded data, such as data that may be malicious. The computer system 200 includes a source 210 connected to information handling system 100 through a communication medium 220. Source 210 may correspond to a transmitter and information handling system 100 may be a target, where source 210 and information handling system 100 may be remote from or local to one another. During normal operation, direction of I/O data such as a graphics file 215 may flow from source 210 to information handling system 100.

Information handling system 100 includes a steganalyzer 230 and a graphics file analyzer 240. Steganalyzer 230 may be configured to monitor the computing activities occurring at the information handling system 100. Steganalyzer 230 may detect potential steganography on the I/O data transmitted to and from information handling system 100. For example, graphics file analyzer 240 may be configured to detect and remove embedded data 225 from graphics file 215 based on detection of a pre-fix or post-fix graphics file signature. Steganalyzer 230 may also detect potential steganography on data files in storage and/or memory of information handling system 100. As used herein, data files include PNG files and JPG files and other graphics formats. For example, graphics file 215 may have been present in information handling system 100 before the installation of steganalyzer 230. Once activated, steganalyzer 230 may then process or analyze graphics file 215. Steganalyzer 230 may also include a speaker and/or display device to provide textual, audiovisual and/or graphical output of results of the analysis.

FIG. 2 is annotated with a series of letters A-B. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations.

At stage A, graphics file 215 is transmitted from source 210 to information handling system 100. Steganalyzer 230 includes graphics file analyzer 240 and may be configured to detect and/or remove embedded data in graphics files. Steganalyzer 230 may be implemented in hardware, software, or a combination of the two. In other embodiments, steganalyzer 230 may be distinct from information handling system 100 and located remotely from or local to information handling system 100. Steganalyzer 230 may be a stand-alone processing system or integrated with another processing system such as a data storage system, web services or the like.

At stage B, steganalyzer 230 may begin processing graphics file 215 that includes embedded data 225. Processing graphics file 215 includes detecting and extracting embedded data 225 from graphics file 215. Steganalyzer 230 may direct graphics file analyzer 240 to process graphics file 215. Graphics file analyzer 240 may remove embedded data from a body of the graphics file. Graphics file analyzer 240 may decode or parse the graphics file 215 to determine if graphics file 215 is a graphics file, regardless of whether the file is named with a graphics file extension. If graphics file analyzer 240 determines the graphics file 215 is a graphics file, then graphics file analyzer 240 may process the graphics file 215 using the binary code conversion process described herein to remove any embedded data 225 present in graphics file 215. This processed may be referred to herein as "purification" of the file, regardless of whether the original file contained malicious embedded data. In addition, graphics file analyzer 240 and/or steganalyzer 230 may perform an action after detection of embedded data 225. For example, steganalyzer 230 may determine that embedded data was present prior to the processing, such as by comparing the size of the processed file with the original graphics files 215, and generate an alert to notify a user regarding the detection of embedded data 225, at which point the user may perform further action.

Steganalyzer 230 may update information associated with graphics file 215. For example, steganalyzer 230 may set a flag to true to identify that embedded data 225 was detected in graphics file 215. The flag may have been initialized to false prior to the processing of graphics file 215. Graphics file analyzer 240 may also move graphics file 215 to a quarantine prior to extracting embedded data 225. After removal of embedded data 225, steganalyzer 230 may have sufficient information to identify embedded data 225. Steganalyzer 230 may then invoke a function to identify a cryptographic hash of embedded data 225 and direct a malware detection system such as Dell EMC RecoverPoint® of a possible infection in other data files and/or to disable the malware once detected.

Figure 3:
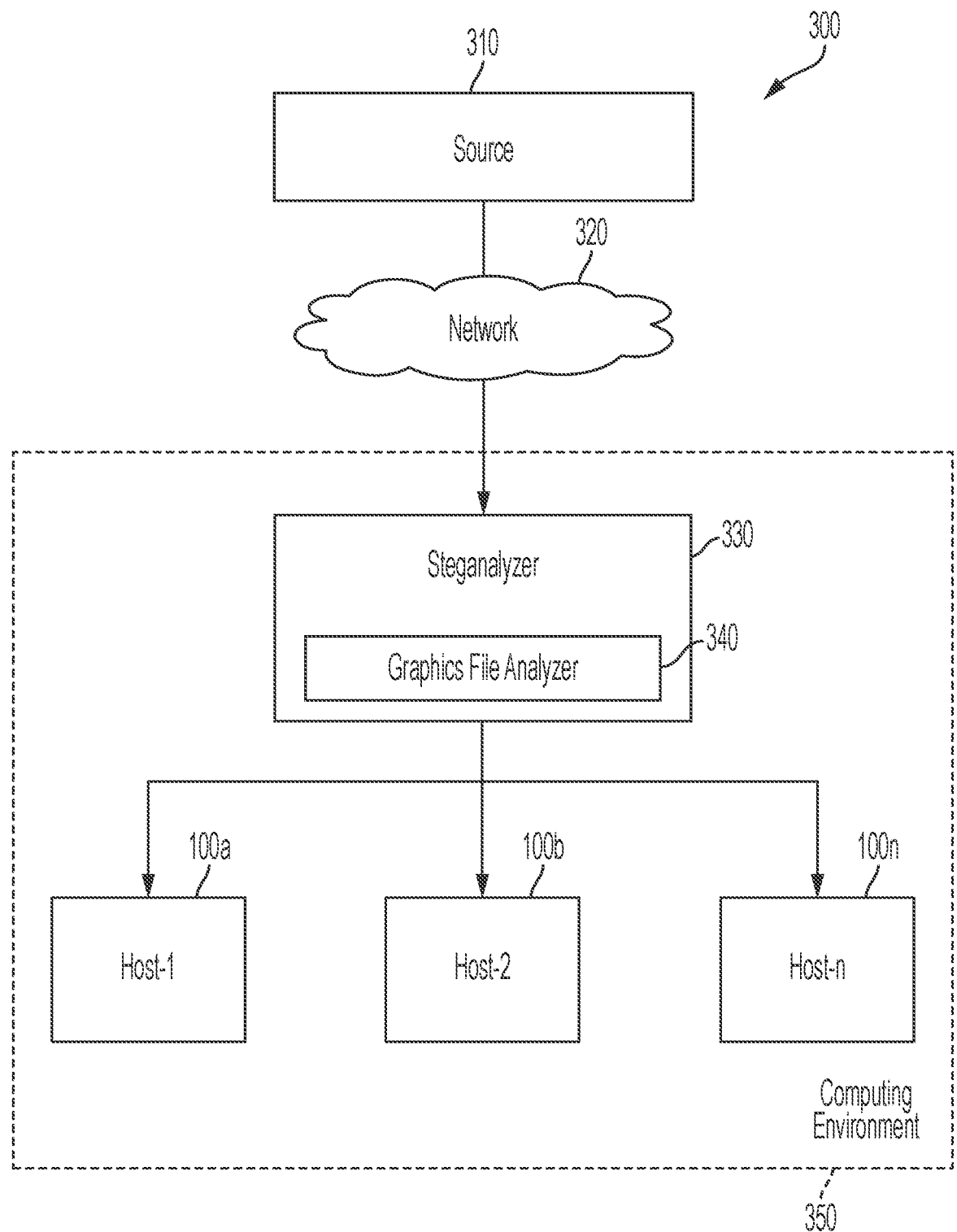
FIG. 3 is a block diagram of a computer system for detecting and removing embedded data from the graphics files, according to at least one embodiment of the present disclosure.

FIG. 3 shows another computer system 300 for detecting and removing embedded data from graphics files. The computer system 300 includes a source 310 connected to a computing environment 350 via a network 320. Computing environment 350 may be a distributed computing environment which includes hosts 100*a*-100*n* and a steganalyzer 330. Steganalyzer 330 includes a graphics file analyzer 340. Steganalyzer 330 may be configured to detect the presence of embedded data based on the analysis performed on suspected files. Steganalyzer 330 may further be configured to remove detected embedded data thus purifying suspected files.

Source 310 may transmit I/O data to one or more of hosts 100*a*-100*n* in computing environment 350. Steganalyzer 330 may be included in a workstation monitoring system configured to monitor the computing activities occurring at the information handling system 100. For example, the workstation monitoring system may be configured to monitor I/O data that is transmitted to and from one or more of hosts 100*a*-100*n*. The network monitoring system may be a proxy server or a gateway through which I/O data pass through computing environment 350. The network monitoring system may also be data loss prevention and security solution that protects I/O data of an organization.

Network 320 may be a global computer network such as the Internet, a wide area network (WAN), a local area network, a satellite network, a telephone or cable network, or various portions or combinations of these and other types of networks. A portion of network 320 may be wired, wireless, or a combination of wired and wireless.

Each of hosts 100*a*-100*n* may all be located at the same physical site or may be in different physical locations and may have applications to perform different types of data operations. The applications performing the different types of data operations may be configured to invoke steganalyzer 330 when digital media files are detected during data operations. Further, hosts 100*a*-100*n* may be protected resources such as resources wherein access is controlled by an authorization and/or authentication server. Accordingly, steganalyzer 330 may be included in the authorization and/authentication server that monitors access to hosts 100*a*-100*n*.

Steganalyzer 330 and/or graphics file analyzer 340 may maintain information regarding the graphics files that may have been processed. The information may include data regarding the frequency of I/O activity such as a number of files transmitted over a number of seconds, minutes, hours, days, weeks, etc. Additional information such as original location, source, and/or user that transmitted the data may also be maintained. For example, if a particular source has a number of graphics files found with embedded data exceeding a certain threshold, steganalyzer 330 and/or graphics file analyzer 340 may set a flag to identify the particular source. An action may be then taken to mitigate the possible effects of malware from the particular source, such as generate a notification when the I/O data from the particular source is detected. A flag may be used to determine whether to block I/O data from the particular source, for example, if the number of I/O data from the particular source that was found to have embedded data is above a threshold.

Figure 4:
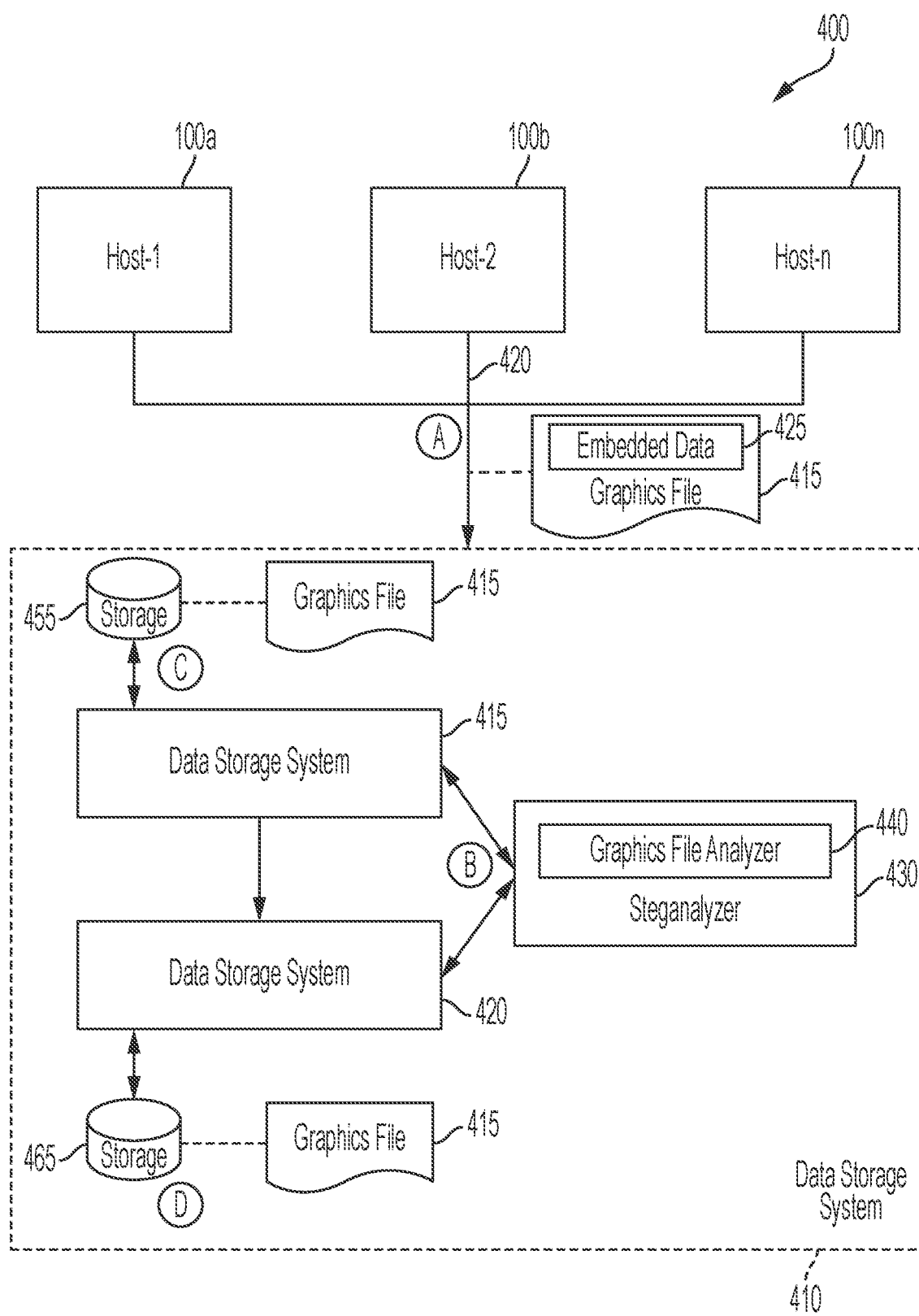
FIG. 4 is a block diagram of a computer system for detecting and removing embedded data from the graphics files, according to at least one embodiment of the present disclosure.

FIG. 4 shows another computer system 400 for detecting and removing embedded data from graphics files. The computer system 400 includes a data storage system 410 connected to information handling systems 100*a*-100*n* also referred to as hosts 100*a*-100*n* through a communication medium 420. Data storage system 410 of FIG. 4 may include one or more interconnected data storage systems such as a data storage system 450 and a data storage system 460. Data storage system 450 may include a storage device 455. Data storage system 450 may include a storage device 465. Each of the interconnected data storage systems may be resources included in an embodiment of the computer system 400 of FIG. 4 to provide storage services to, for example, hosts 100*a*-100*n*. A steganalyzer 430 includes a graphics file analyzer 440 may be placed anywhere in the data path between hosts 100*a*-100*n* and data storage system 410.

Communication medium 420 may use a variety of different communication protocols such as small computer system interface (SCSI), enterprise systems connection (ESCON), Fibre Channel, internet small computer system interface (iSCSI), or Gigabit Ethernet (GigE), and the like. Some or all of the connections by which hosts 100*a*-100*n* and data storage system 410 may be connected to communication medium 420 may pass through other communication devices, such as switching equipment, a phone line, a repeater, a multiplexer or even a satellite.

Data storage system 410 may have a remote adapter (RA) including a processor used to facilitate communication between data storage systems, such as between two of the same or different types of data storage systems such as a primary data storage system and a secondary data storage system. In this embodiment, data storage system 450 may be the primary data storage system and data storage system 460 may be the secondary data storage system. The RA of data storage system 410 may include steganalyzer 430 and/or graphics file analyzer 440. In one embodiment, the RAs of the different data storage systems may communicate over a Gigabit Ethernet or Fibre Channel transmission channel supporting messaging traffic between data storage systems. The RA may be hardware including a processor used to facilitate communication between data storage systems, such as between two Symmetrix data storage systems. The RA may be used with Symmetrix Remote Data Facility (SRDF), a family of products (provided by Dell EMC, a division of Dell Inc.) that facilitate the data replication from one Symmetrix storage array to another through a storage area network or an internet protocol (IP) network. SRDF logically pairs a device or a group of devices from each array and replicates data from one to the other synchronously or asynchronously.

Each of hosts 100a-100n and data storage system 410 may all be located at the same physical site or may be in different physical locations. Each of the hosts 100a-100n may perform different types of data operations in accordance with different tasks and applications executing on hosts 100a-100n. In the embodiment of FIG. 4, any one of hosts 100a-100n may issue a data request to data storage system 410 to perform a data operation. For example, an application executing on one of hosts 100a-100n may perform a read or write operation resulting in one or more data requests to data storage system 410.

In another example, one of the hosts 100a-100 may request data storage system 410 to backup data files in the primary data storage system. Steganalyzer 430 may perform malware purification during the backup operation. After performing the backup operation, the primary storage system may notify data storage system 410 that it has completed the malware purification. The primary storage system may set a flag to identify whether a graphics file has been purified. Further, data storage system 410 may perform a verification scan to verify whether the malware purification has been properly performed. Instead of performing the verification rescan of each of the backup data files, data storage system 410 may use information associated with the data files that has been purified. For example, data storage system 410 may use a flag to identify graphics files that has been purified. As used herein, the data file such as a graphics file 415 may have been purified of embedded data 425 if embedded data 425 has been detected and removed from graphics file 415.

In yet another example, data storage system 410 may replicate the data files to the secondary data storage system. The secondary data storage system may perform malware purification during the replication operation. Steganalyzer 430 may perform malware purification on the graphics files that may not have been purified during the backup operation. Similar to above, steganalyzer 430 may use the flag to identify whether a particular graphics file has been purified. For example, if the particular graphics file has been identified to be free of embedded data, steganalyzer 430 may not analyze the particular graphics file during replication.

After performing the replication operation, the secondary storage system may notify data storage system 410 that the replication operation is complete. Steganalyzer 430 may also determine other properties of the data files such as a modification date/time to determine whether the data file was modified. For example, steganalyzer 430 may review the modification date/time property prior to replicating the data files. If the modification date/time property indicates that the graphics file was not modified after it was stored in storage device 455 of data storage system 450, steganalyzer 430 may not analyze the graphics file prior to transmitting the graphics file to storage device 465 of data storage system 460. Otherwise, steganalyzer 430 may analyze the graphics file for steganography.

In yet another example, data storage system 410 may restore the data files. The data storage system 410 may perform malware purification during the restoration operation. Steganalyzer 430 may perform malware purification on the graphics files that may not have been purified during the backup and/or replication operation. There may be one flag set to indicate that the graphics files have been purified during the backup operation and a different flag to indicate that the graphics files have been purified during the replication operation. Similar to above, steganalyzer 430 may use the flag to identify whether a particular graphics file has been purified. For example, if the particular graphics file has been identified to be free of embedded data, steganalyzer 430 may not analyze the particular graphics file during restoration.

After performing the restoration operation, the data storage system 410 may notify one of hosts 100a-100n that the restoration operation is complete. Steganalyzer 430 may also determine other properties of the data files such as a modification date/time to determine whether the data file was modified. For example, steganalyzer 430 may review the modification date/time property prior to restoring the data files. If the modification date/time property indicates that the data file was not modified after it was backed up and/or replicated, steganalyzer 430 may not analyze the data files prior to transmitting the data files to the hosts 100a-100n. Otherwise, steganalyzer 430 may analyze the data files for steganography.

FIG. 4 is annotated with a series of letters A-C. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations.

At stage A, one of hosts 100a-100n may issue a command, such as to write I/O data such as graphics file 415 to data storage system 410. Data storage system 410 may first write graphics file 415 in its data cache and mark graphics file 415 as write pending. The data cache may be a reserved memory in data storage system 410. Once written to the cache memory, the host that issued the command may be notified that the write operation has completed. At a later point time, the write data may be destaged from the data cache to the physical storage device, such as by a disk adapter.

At stage B, data storage system 410 begins processing graphics file 415. Processing I/O data 415 includes detecting and removing embedded data in graphics file 415. Steganalyzer 430 may be a splitter. Steganalyzer 430 may be a Dell EMC RecoverPoint splitters by Dell EMC Corporation. In a further embodiment, each splitter may be an agent running on a production host, a switch or a storage array that may be configured to intercept the I/O data and split the I/O data to a data protection appliance and to data storage system 410. In certain other embodiments, steganalyzer 430 may be a data protection appliance which may be a computer or a cluster of computers or a set of processes that serve as a data protection appliance responsible for data protection services. At stage C, after processing graphics file 415 by performing a purification process, data storage system 410 stores processed graphics file 415 in storage device 455. At stage D, data storage system 410 may replicate graphics file 415 in data storage system 460. Data storage 460 may invoke steganalyzer 430 to analyze and/or purify graphics file 415 prior to replication. Steganalyzer 430 may determine whether graphics file 415 has been purified and/or modified after a purification, after which data storage 460 may store graphics file 415 in storage device 465.

Figure 5:
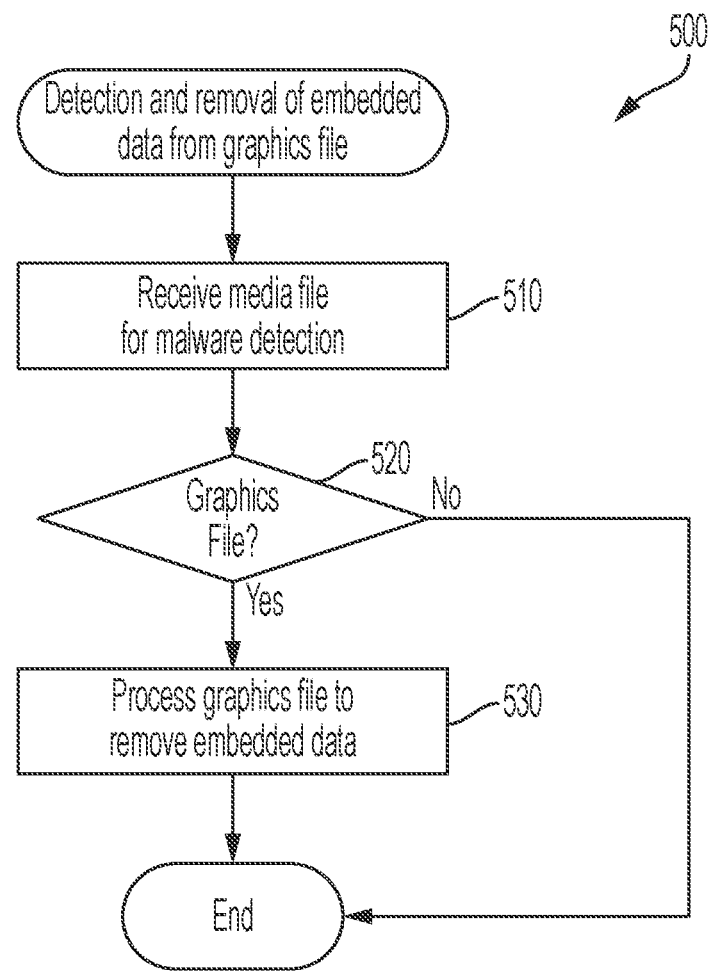
FIG. 5 is a flow diagram of a method for detecting and removing embedded data from the graphics files, according to at least one embodiment of the present disclosure.

FIG. 5 shows a method 500 for detecting and removing embedded data in a graphics file. Detecting and removing embedded data in the graphics file may be performed by a steganalyzer as in FIG. 2. At block 510, an information handling system receives a file. The information handling system may receive the file for processing and/or storage. The file received may be data or a digital media file. For example, the information handling system may receive the file as a graphics datastream for processing. The graphics datastream may pass through the steganalyzer during transmission to the information handling system.

At block 520, the steganalyzer may determine whether the received file is a graphics file. The steganalyzer may determine whether the received file is a graphics file by parsing and/or decoding the graphics file and identifying whether the graphics file includes the graphics file signature. If the received file is a graphics file, the process proceeds to block 530. Otherwise, the process ends.

At block 530, the steganalyzer processes the graphics file to remove possible embedded data in a body of the graphics file. The process at block 530 may include converting a body segment of the graphics file to binary code that represents the image contained in the body segment. The binary code can then be converted into a replacement body segment for a replacement graphics file. The process of converting the body segment into binary code and back results in the deletion of malicious code within the replacement body segment. The conversion may be carried out with a lossless compression algorithm that results in the replacement body segment being an exact duplicate of the image contained in the original graphics file, but lacking any embedded data. The steganalyzer may be configured to process one or many types of graphics file formats, such as PNG files and/or JPG files. The steganalyzer may be configured to analyze the graphics files to detect whether embedded data was removed by the processing at block 530, such as by comparing file sizes of the graphics file and the replacement graphics file. In some embodiments, the steganalyzer may examine each file for all known pre-fix and post-fix graphics file signatures, such as a pre-fix signature for a JPG file, a pre-fix for a PNG file, etc.

The term "user" in this context should be understood to encompass, by way of example and without limitation, a user device, a person utilizing or otherwise associated with the device, or a combination of both. An operation described herein as being performed by a user may therefore be performed by a user device, or by a combination of both the person and the device.

FIG. 6 is an example of a portion of a body of a PNG file 640. PNG file 640 shows PNG pre-fix signature 630 located at the beginning of PNG file 630, and may be used to determine that the file being examined is a graphics file, which when detected by steganalyzer triggers the purification processing by converting to binary code and back to a graphics file. The signature 630 may also be used to determine the body segment of the PNG file 640 for conversion to binary code.

FIG. 7 is an example of a portion of a body of a JPG file 740. JPG file 740 shows JPG pre-fix signature 730 located at the beginning of JPG file 730, which when detected by steganalyzer triggers the purification processing by converting to binary code and back to a graphics file. The signature 730 may also be used to determine the body segment of the PNG file 740 for conversion to binary code.

Figure 8:
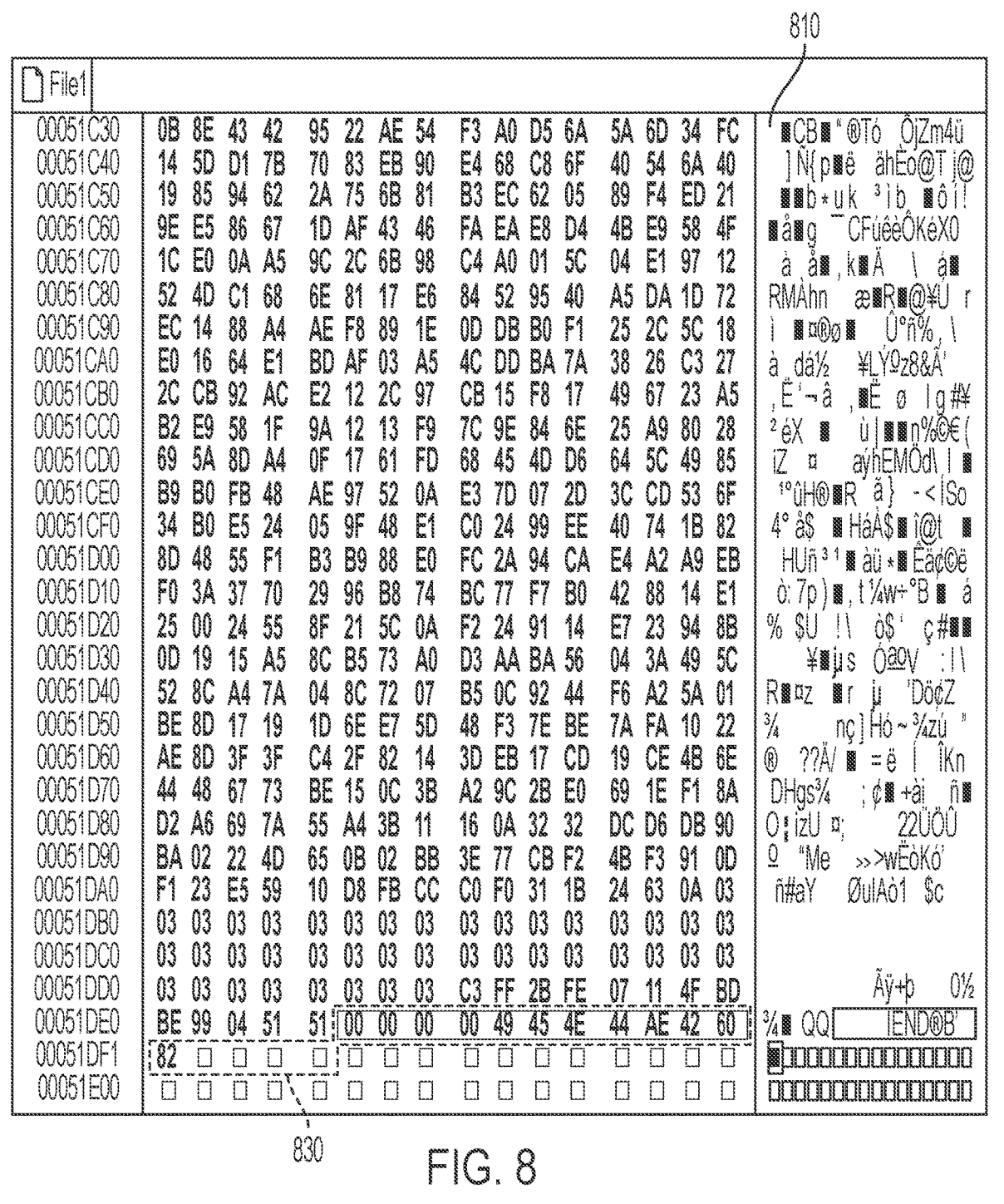

FIG. 8 shows an example of a portion of a PNG file 810. PNG file 810 shows PNG post-fix signature 830 at the end of the body of graphics content, which when detected by steganalyzer triggers the purification processing by converting to binary code and back to a graphics file.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method, comprising:
determining, by a processor, a presence of a body segment of a file beginning at a first location following a pre-fix graphics file signature and ending at a second location at a start of a post-fix graphics file signature, the body segment comprising graphics data such that the file is a graphics file;
converting, by the processor, the body segment of the graphics file into representative binary code based on determining that the file is a graphics file;
converting, by the processor, the representative binary code into a replacement body segment for the graphics file; and
writing, by the processor, a new graphics file comprising the replacement body segment.

2. The method of claim 1, wherein the step of converting the representative binary code into the replacement body segment comprises executing a lossless data compression algorithm.

3. The method of claim 1, wherein the step of determining the body segment comprises parsing, by the processor, the graphics file to determine a location of a graphics file signature in the graphics file.

4. The method of claim 3, wherein the step of parsing the graphics file comprises:
- determining the first location of the pre-fix graphics file signature; and
- determining the second location of the post-fix graphics file signature.

5. The method of claim 4, wherein the graphics file comprises a portable network graphics (PNG) file, and wherein the pre-fix graphics file signature comprises hexadecimal values comprising "89 50 4E 47 0D 0A 1A 0A 00 00 00 0D 49 48 44 52 00 00".

6. The method of claim 5, wherein the post-fix graphics file signature comprises hexadecimal values comprising "00 00 00 00 49 45 4E 44 AE 42 60 82".

7. The method of claim 4, wherein the graphics file comprises a Joint Photographic Experts Group (JPEG) file, and wherein the pre-fix graphics file signature comprises hexadecimal values comprising "FF D8 FF E0 00 10 4A 46 49 46 00 01 01 00 00 01 00 01 00 00 FF DB 00 84 00 09 06 07".

8. The method of claim 1, further comprising scanning a plurality of files to determine an existence of a graphics file, wherein the plurality of files comprises graphics files and non-graphics files.

9. An information handling system comprising:
- a processor; and
- a memory having code stored thereon that, when executed by the processor, performs a method comprising:
  - determining, by a processor, a presence of a body segment of a file beginning at a first location following a pre-fix graphics file signature and ending at a second location at a start of a post-fix graphics file signature, the body segment comprising graphics data such that the file is a graphics file;
  - converting, by the processor, the body segment of the graphics file into representative binary code based on determining that the file is a graphics file;
  - converting, by the processor, the representative binary code into a replacement body segment for the graphics file; and
  - writing, by the processor, a new graphics file comprising the replacement body segment.

10. The information handling system of claim 9, wherein the step of converting the representative binary code into the replacement body segment comprises compression algorithm.

11. The information handling system of claim 9, wherein the step of determining the body segment comprises parsing, by the processor, the graphics file to determine a location of a graphics file signature in the graphics file.

12. The information handling system of claim 11, wherein the step of parsing the graphics file comprises:
- determining the first location of the pre-fix graphics file signature; and
- determining the second location of the post-fix graphics file signature.

13. The information handling system of claim 12, wherein the graphics file comprises a portable network graphics (PNG) file, and wherein the pre-fix graphics file signature comprises hexadecimal values comprising "89 50 4E 47 0D 0A 1A 0A 00 00 00 0D 49 48 44 52 00 00".

14. The information handling system of claim 13, wherein the post-fix graphics file signature comprises hexadecimal values comprising "00 00 00 00 49 45 4E 44 AE 42 60 82".

15. The information handling system of claim 12, wherein the graphics file comprises a Joint Photographic Experts Group (JPEG) file, and wherein the pre-fix graphics file signature comprises hexadecimal values comprising "FF D8 FF E0 00 10 4A 46 49 46 00 01 01 00 00 01 00 01 00 00 FF DB 00 84 00 09 06 07".

16. A non-transitory computer-readable medium including code for performing a method, the method comprising:
- determining, by a processor, a presence of a body segment of a file beginning at a first location following a pre-fix graphics file signature and ending at a second location at a start of a post-fix graphics file signature, the body segment comprising graphics data such that the file is a graphics file;
- converting, by the processor, the body segment of the graphics file into representative binary code based on determining that the file is a graphics file;
- converting, by the processor, the representative binary code into a replacement body segment for the graphics file; and
- writing, by the processor, a new graphics file comprising the replacement body segment.

17. The non-transitory computer-readable medium of claim 16, wherein the step of converting the representative binary code into the replacement body segment comprises executing a lossless data compression algorithm.

18. The non-transitory computer-readable medium of claim 16, wherein the step of determining the body segment comprises parsing, by the processor, the graphics file to determine a location of a graphics file signature in the graphics file, and wherein the step of parsing the graphics file comprises:
- determining the first location of the pre-fix graphics file signature; and
- determining the second location of the post-fix graphics file signature.

19. The non-transitory computer-readable medium of claim 18, wherein the graphics file comprises a portable network graphics (PNG) file, and wherein the pre-fix graphics file signature comprises hexadecimal values comprising "89 50 4E 47 0D 0A 1A 0A 00 00 00 0D 49 48 44 52 00 00", and wherein the post-fix graphics file signature comprises hexadecimal values comprising "00 00 00 00 49 45 4E 44 AE 42 60 82".

20. The non-transitory computer-readable medium of claim 18, wherein the graphics file comprises a Joint Photographic Experts Group (JPEG) file, and wherein the pre-fix graphics file signature comprises hexadecimal values comprising "FF D8 FF E0 00 10 4A 46 49 46 00 01 01 00 00 01 00 01 00 00 FF DB 00 84 00 09 06 07".

* * * * *